US 6,189,915 B1

(12) United States Patent
Soderquist et al.

(10) Patent No.: US 6,189,915 B1
(45) Date of Patent: Feb. 20, 2001

(54) AIRBAG CUSHION ATTACHMENT

(75) Inventors: Quin Soderquist, South Weber; Lance M. Bosgieter, Roy, both of UT (US)

(73) Assignee: Autoliv ASP, Inc., Ogden, UT (US)

(*) Notice: Under 35 U.S.C. 154(b), the term of this patent shall be extended for 0 days.

(21) Appl. No.: 09/229,372

(22) Filed: Jan. 13, 1999

(51) Int. Cl.[7] .................................................. B60R 21/16
(52) U.S. Cl. .................... 280/728.2; 280/741; 280/743.2
(58) Field of Search .............................. 280/743.1, 743.2, 280/728.2, 741, 736, 740, 742

(56) References Cited

U.S. PATENT DOCUMENTS

| Re. 34,204 | 3/1993 | Takada . |
|---|---|---|
| 3,877,882 | * 4/1975 | Lette et al. . |
| 4,830,401 | 5/1989 | Honda . |
| 5,094,477 | 3/1992 | Togawa . |
| 5,098,125 | 3/1992 | Thornton et al. . |
| 5,141,247 | 8/1992 | Barth . |
| 5,141,787 | 8/1992 | Yamamoto . |
| 5,172,932 | 12/1992 | Watanabe et al. . |
| 5,186,489 | 2/1993 | Imai . |
| 5,280,952 | 1/1994 | Hirabayashi et al. . |
| 5,294,148 | 3/1994 | Imai . |
| 5,405,166 | 4/1995 | Rogerson . |
| 5,560,643 | 10/1996 | Lang et al. . |
| 5,573,270 | 11/1996 | Sogi et al. . |
| 5,580,080 | 12/1996 | Soderquist et al. . |
| 5,634,658 | 6/1997 | Adams . |
| 5,685,562 | 11/1997 | Jordon et al. . |
| 5,707,711 | 1/1998 | Kitamura . |
| 5,765,867 | 6/1998 | French . |
| 5,848,805 | * 12/1998 | Sogi et al. ..................... 280/743.2 |

FOREIGN PATENT DOCUMENTS

| 2109477 | 5/1972 | (FR) . |
|---|---|---|
| 2268124 | 1/1994 | (GB) . |
| 63-207754 | 8/1988 | (JP) . |
| 8-225050 | 9/1996 | (JP) . |

* cited by examiner

Primary Examiner—Eric Culbreth
(74) Attorney, Agent, or Firm—Sally J. Brown (57) ABSTRACT

Arrangements and methods for attaching an airbag cushion are provided wherein an attachment opening of the airbag cushion is clamped between an inflator and an airbag retainer which previously had been floatingly confined within the body of the airbag cushion.

5 Claims, 8 Drawing Sheets

AIRBAG CUSHION ATTACHMENT

BACKGROUND OF THE INVENTION

This invention relates generally to vehicle occupant passive restraint systems and, more particularly, to improved arrangements and methods for attaching airbag cushions such as used in such systems.

It is well known to protect a vehicle occupant by means of an inflatable vehicle occupant restraint, such as in the form of a cushion or bag, commonly referred to as an "airbag cushion." In practice, it is common that inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior. In practice, such airbag cushions are typically inflated or expanded with gas when the vehicle encounters sudden deceleration, such as in the event of a collision.

In such systems, airbag cushions are normally housed in an uninflated and folded condition to minimize space requirements. Such systems also typically include one or more crash sensors mounted on or to the frame or body of the vehicle to detect sudden decelerations of the vehicle and to electronically trigger activation of the system. Upon actuation of the system, such as upon receipt of an appropriate signal from the associated system crash sensor, the cushion begins to be inflated, in a matter of no more than a few milliseconds, with gas produced or supplied by a device commonly referred to as an "inflator."

Airbag module assemblies typically involve the manufacture, installation and inspection of many and various component parts. Common airbag module assembly components typically include a cover, an airbag cushion, a means for holding the airbag cushion such as an annular retainer or retaining ring, a supporting plate such as a module housing or mounting plate, a gas generator or inflator, fasteners and means to attach the assembly to a steering wheel, dashboard or other appropriate vehicle structure.

It is common that in such airbag module assemblies, the airbag cushion include a relatively large and generally centrally located inflation gas inlet opening, which is held or otherwise clamped between a flange of the inflator, such as extending circumferentially about a disk-shaped inflator device, and an annular retaining ring through a module housing or mounting plate. Rivets or other form of fasteners are typically used to attach the retaining ring to the gas inlet opening of the airbag cushion at various attachment points spaced about the periphery of the inflator. The retaining ring, with the airbag cushion affixed thereto, is then bolted to the module housing and the flange of the inflator with the inflator so arranged that the flange thereof is positioned externally of the airbag cushion and the module housing.

As will be appreciated, in order to permit the inflation of an airbag cushion within the relatively short available time period, gas or other inflation medium is generally expelled or discharged from an associated inflator at a relatively high flow rate or velocity. Such high flow rate or velocity discharges can create forces within the airbag cushion such as may tend to blow or otherwise force the airbag cushion from the inflator.

In such assemblies, the force holding the airbag cushion to the inflator and the module housing may concentrate to form undesirable shearing stresses on the assembly and in particular on the airbag cushion such at one or more of the fastening sites. In view thereof, airbag cushions are commonly fabricated to include several reinforcement layers in the vicinity of the central inflation gas inlet opening whereat the airbag cushion is held or otherwise clamped. While the inclusion of such reinforcement layers may help the airbag cushion to structurally withstand such deployment stresses, the inclusion of such reinforcements almost invariably increases the cost of either or both manufacture and assembly.

Further, the use of multiple rivets, bolts or other, similar, fastening means to attach an airbag cushion to an associated retainer ring or other module component can be a cause for reworking inflator module assemblies in the manufacture thereof. When reworking is not possible, defective airbag modules must be discarded.

In addition, while a strong form of joinder, attachment or mounting of an airbag cushion with an associated inflator or airbag module structure is generally desired to better assure retention of the airbag cushion upon deployment thereof, it is also generally desirable that the form of joinder, attachment or mounting be simple to assemble and inexpensive to produce.

Still further, the inclusion of a flange, such as extending circumferentially about a disk-shaped inflator device, may undesirably increase assembly weight.

Thus, there is a need and a demand for the provision of improved arrangements and methods for attaching airbag cushions used in vehicle occupant passive restraint systems.

In particular, there is a need and a demand for arrangements and methods for attaching airbag cushions used in vehicle occupant passive restraint systems which minimize or avoid the problems and associated failure possibilities which may exist or be associated with module assemblies which rely on the use of multiple rivets, bolts or other, similar, fastening means to attach an airbag cushion to an associated retainer ring or other module component and which may further reduce or minimize the costs associated with either or both the manufacture and assembly thereof.

SUMMARY OF THE INVENTION

A general object of the invention is to provide improved arrangements and methods for attaching an airbag cushion such as used in vehicle occupant passive restraint systems.

A more specific objective of the invention is to overcome one or more of the problems described above.

The general object of the invention can be attained, at least in part, through a specified airbag module combination which includes an inflatable airbag cushion, an inflator, a module element extending from the inflator into the airbag cushion and an airbag retainer. The cushion includes an inflatable body which defines an attachment opening. The inflator is disposed externally relative to the cushion inflatable body with the module element extending from the inflator through the cushion attachment opening. The module element has opposed first and second ends with the first end adjacent the inflator and directly joined thereto and the second end extending into the cushion inflatable body. The module element provides a conduit for passage of inflation fluid into the cushion inflatable body. The airbag retainer is fixable relative to the module element to clamp the cushion opening between the inflator and the airbag retainer and wherein, prior to fixation to the module element, the airbag retainer is floatingly confined within the cushion inflatable body.

The prior art generally fails to provide a form of joinder, attachment or mounting of an airbag cushion with an associated inflator or airbag module structure which is either as effective, simple or economical as may be desired and such as may avoid deployment stress concentrations and complications associated therewith as effectively as may be desired.

In accordance with another embodiment, the invention comprehends a method of joining an inflatable airbag cushion in an airbag module. The airbag module includes: an inflatable airbag cushion with an inflatable body defining an attachment opening, an inflator disposed externally relative to the inflatable body and a module element extending from the inflator through the cushion attachment opening. The module element includes opposed first and second ends with the first end disposed adjacent the inflator and directly joined thereto. Such a method includes the step of fixing an airbag retainer relative to the module element to clamp the cushion opening between the inflator and the airbag retainer wherein prior to the fixing step, the airbag retainer is floatingly confined within the inflatable body. The module element provides a conduit for passage of inflation fluid with the module element second end extending into the cushion inflatable body.

As used herein, references to an airbag retainer or the like element as being "floatingly confined" within a cushion inflatable body are to be understood to refer to such element as being normally contained within such respective cushion inflatable body but not in a fixed relative arrangement relative thereto.

Other objects and advantages will be apparent to those skilled in the art from the following detailed description taken in conjunction with the appended claims and drawings.

DETAILED DESCRIPTION OF THE INVENTION

The present invention, as described in greater detail below, provides improved arrangements and methods for attaching airbag cushions such as used in an inflatable restraint system such as used to provide protection to vehicle occupants.

While the invention is described below with particular reference to a driver side airbag module assembly combination for automotive vehicles such as including vans, pick-up trucks, and particularly automobiles, it is to be understood that the invention also has applicability not only with other types or kinds of airbag module assemblies including, for example, passenger side, side impact and curtain airbag assemblies such as used for automotive vehicles but also with other types or kinds of vehicles including, for example, airplanes.

Figure 1:
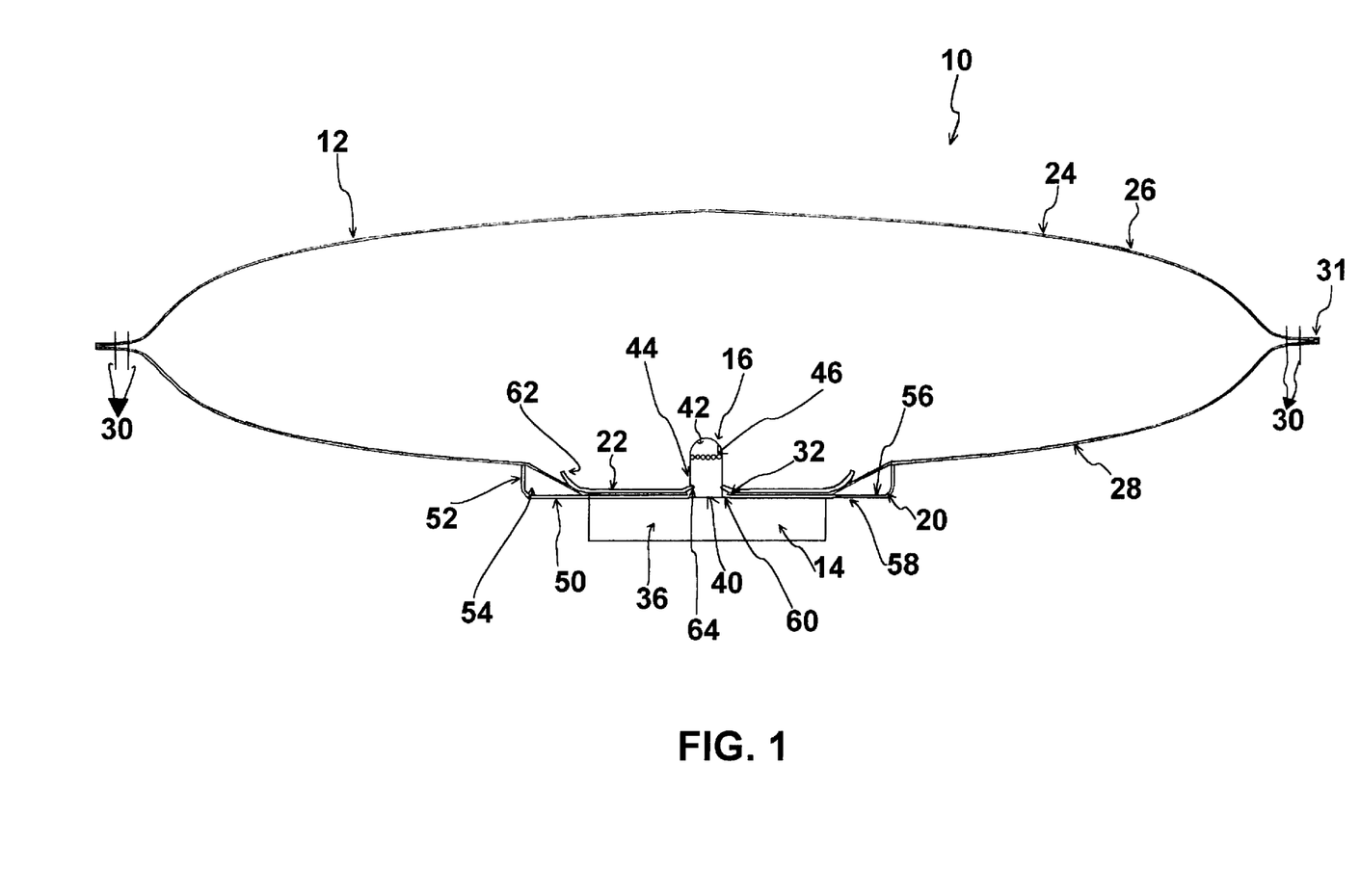
FIG. 1 is a simplified, partially in section, side view of an airbag cushion and inflator in accordance with a first embodiment of the invention.

Referring to the drawings and initially referring particularly to FIG. 1, there is illustrated an airbag module assembly combination, generally designated by the reference numeral 10, in accordance with one embodiment of the invention. It is to be understood that in the practice of the invention, such an airbag module assembly combination is commonly housed or secured in association with an appropriate corresponding or cooperating portion of an associated vehicle (not shown). In the case of a driver side module installation, such an assembly combination is typically housed in or secured to the steering wheel. In the case of a passenger side module installation, such an assembly is normally housed in what is alternatively commonly referred to as the instrument panel or dashboard of the vehicle opposite the passenger seat.

The assembly combination 10 includes an airbag cushion 12, an inflatable restraint system inflator 14, a diffuser 16, a reaction or mounting plate 20 and an airbag retainer plate 22.

The airbag cushion 12 includes a main body 24 and, in the broader practice of the invention, may take various forms such as are well known in the art. For example, two circular pieces of suitable airbag cushion material, such as of suitable woven material or fabric, may be laid one on top of the other and a seam formed about their periphery.

As will be appreciated, airbag cushion materials suitable for use in the practice of the invention can take various forms such as may be desired and as are known in the art. All or selected portions of particular airbag cushions in accordance with the invention can be permeable or substantially impermeable to the passage of inflation fluid therethrough. For example, as is known in the art, particular airbag cushions can be fabricated such that one or more selected portions of the cushion, e.g., the front panel, are rendered or otherwise made substantially impermeable to the passage of the particular inflation fluid therethrough.

As also known in the art, substantial impermeability of an airbag cushion or selected portions thereof can be achieved or arrived at by various techniques such as including or applying a selected material coating onto a particular airbag fabric material or by producing an airbag fabric material of a sufficiently tight weave as to render the resulting fabric substantially impermeable, for example. It is to be understood, however, that the broader practice of the invention is not limited to airbag cushions fabricated of any particular material or by any particular process.

Figure 2:
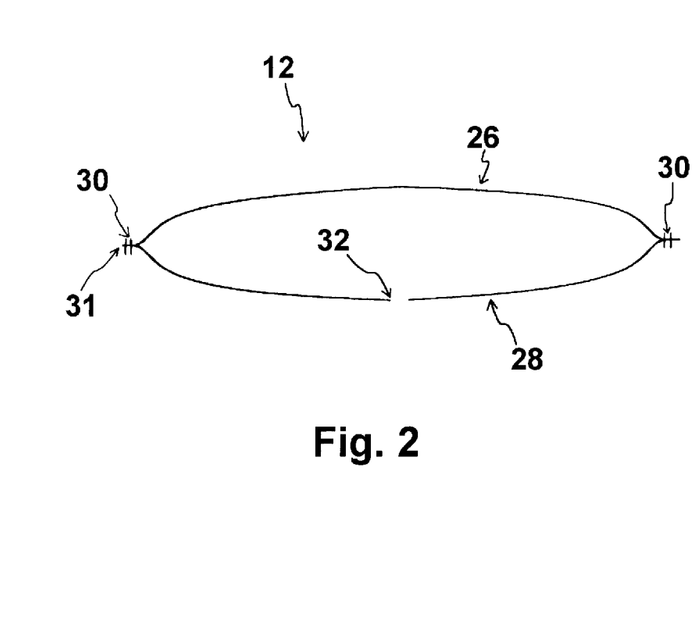
FIG. 2 is a simplified sectional side view of the airbag cushion shown in FIG. 1.
Figure 3:
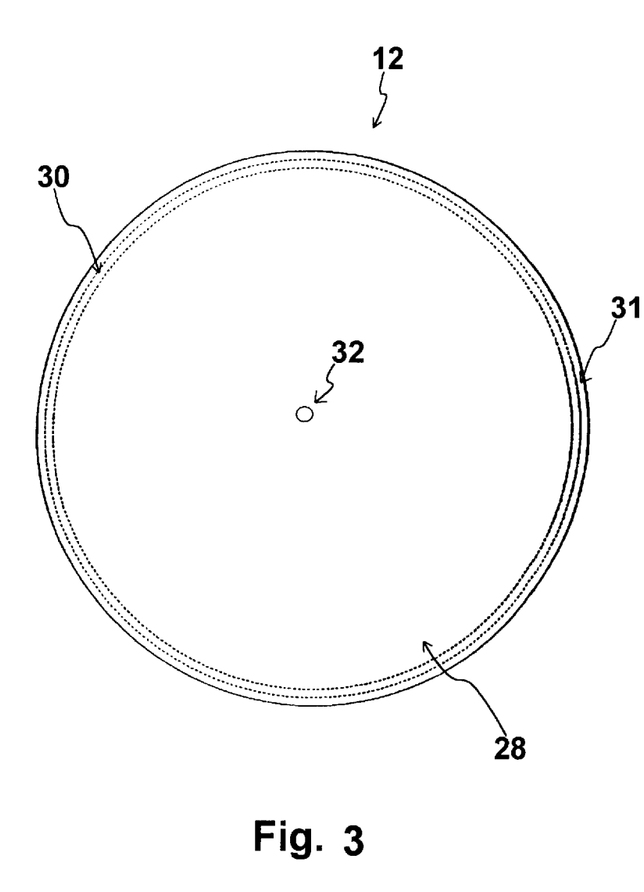
FIG. 3 is a simplified bottom plan view of the airbag cushion shown in FIGS. 1 and 2.

The particular airbag cushion 12, as perhaps best viewed by reference to FIGS. 2 and 3, is generally composed of generally circular front and back panels, 26 and 28, respectively, with the respective peripheries thereof generally joined together by a double stitch sew line 30, with the outer diameter sew selvage 31 exposed or external the completed airbag cushion. The back panel 28 includes a generally centrally located or positioned cushion attachment opening or hole 32, the use of which will be described in greater detail below.

It is to be appreciated that, if desired and such as also described in greater detail below, other particular forms of airbag cushions can be used in the practice of the invention. With whichever type of airbag cushion employed, the corresponding airbag cushion main body will typically include an opening or hole in the form of an opening or cut out in the airbag cushion material.

Returning to FIG. 1, the inflator 14 is generally elongated and cylindrical in shape. Upon actuation, the inflator 14 is adapted to provide gas or other inflation fluid used to inflate the airbag cushion 12. The inflator 14 includes a chamber portion 36 which, as shown, may desirably have the general form of a tube. The inflator 14 generally operates, such as in a manner well known in the art, to generate, produce, form or otherwise provide inflation gas for the inflation of the associated airbag cushion 12. Common or known inflator devices which can be used in the practice of the invention include compressed stored gas inflators, pyrotechnic inflators and hybrid inflators, for example. As will be appreciated, the broader practice of the invention is not limited or otherwise restricted by the particular form or mode of operation of the associated inflator device.

The diffuser 16 is also generally elongated and cylindrical in shape. The diffuser includes a first end 40, a generally opposite distal second end 42 and an attachment notch 44, the use of which will be described in greater detail below, spaced between the first and second ends, respectively. The diffuser first end 40 is joined, connected or otherwise attached to the inflator chamber 36 such that upon actuation of the inflator 14, the inflator chamber 36 is in communication with the diffuser 16 such as to permit inflation fluid to be transmittable therethrough. The diffuser 16 extends through the cushion opening 32 with the diffuser second end 42 disposed within the interior of the cushion 12. The diffuser second end 42 includes a plurality of apertures 46 wherethrough, upon actuation and such as in a manner known in the art, inflation gases can be appropriately discharged or "diffused" into the interior of the airbag cushion 12 to effect the inflation thereof.

The reaction plate 20 is generally rectangular in shape and includes a bottom wall 50 and a surrounding upwardly extending side wall 52 such as to form, such as in cooperation with an associated module cover (not shown), an airbag storage volume 54. The reaction plate bottom wall 50 has an inner side 56, an outer side 58 and includes a generally circular opening 60. The inflator diffuser 16 may be inserted into the reaction plate bottom wall opening 60, from the bottom wall outer side 58, and subsequently through the cushion opening 32, which cushion opening is generally adjacent the reaction plate bottom wall opening 60 at the inner side 56, thereof It will be appreciated that other types or forms of reaction plate may be used in the practice of the invention and thus the broader practice of the invention is not necessarily limited by the type or form of reaction plate. For example, circular, oval, triangular and square shaped reaction plates can, if desired be used. Further, a reaction plate in accordance with the invention need not necessarily include an upwardly extending side wall such as to form a corresponding airbag storage volume. For example, a flat or essentially flat reaction plate may be used in association with a concave, dish-shaped module cover to form a desired airbag storage volume. The size of the reaction plate utilized in an airbag assembly combination in accordance with the invention will commonly be selected based on either or both the size of the associated airbag cushion and the styling of the associated module cover.

Returning to FIG. 1, the airbag retainer plate 22 is generally sized and shaped to cooperate with the reaction plate 20. For example, in FIG. 1, the airbag retainer plate 22 is generally sized and shaped to fit within the reaction plate 20. The airbag retainer plate 22 has an upwardly extending lip section 62 around the outer periphery thereof The airbag retainer plate 22 also includes a generally circular central opening 64.

The inflator diffuser 16 may be inserted into the airbag retainer plate central opening 64, with the central opening fitting in a securing or mating engagement with the attachment notch 44 about the cylindrical diffuser 16.

In such an arrangement, the airbag cushion opening 32 and the associated portion of the airbag cushion itself are fixed, clamped or otherwise set in a specific position relative to the associated inflator 14 and hardware, including the reaction plate 20 and the airbag retainer plate 22. In particular, the airbag cushion opening 32 is desirably comparatively small in diameter and/or area as compared to traditional airbag cushion openings such as used in association with inflators wherein the cushion is joined or attached about the circumference of a disk-shaped inflator device. The relatively small size of the airbag cushion opening 32 permits, allows or otherwise facilitates the more even or uniform distribution or transfer of the forces and stresses associated with deployment of the airbag cushion through the parent material which constitutes the airbag cushion 12. As a result of such more even or uniform distribution or transfer, concentration of deployment stresses such as may otherwise normally be associated with failure, tearing or other undesired effect upon the airbag cushion material can be avoided or minimized.

At the time prior to the fixation of the airbag retainer 22 to the module element, e.g., the diffuser 16, the airbag retainer 22 is floatingly confined within the cushion inflatable body 24. As will be appreciated, such an arrangement generally allows, permits or otherwise facilitates a degree of adaptability of the assembly process to the particulars of a specific assembly arrangement.

In operation, such as upon the sensing of a collision, an electrical signal is sent to the inflator 14 and results in the discharge of inflation gas through the inflator diffuser 16 and out the apertures 46 into the interior of the airbag cushion 12. In the airbag module assembly combination 10, described above, the diffuser 16 constitutes a module element extending through the cushion opening 32.

In the assembly combination 10 described above, the airbag retainer plate 22 forms a module component housed within the airbag cushion 12 and which module component is substantially planar and coplanar with the cushion inflatable body in the vicinity of the airbag cushion opening 32. As will be appreciated, the inclusion of such a module component within an associated airbag cushion can be accomplished or achieved by various techniques including, for example, placing the module component between the front and back panels of a yet unsewn or partially sewn airbag cushion and then completing the sewing of the airbag cushion.

While the invention has been described above relative to a preferred embodiment wherein the airbag cushion includes a single attachment opening, i.e., the opening 32, and wherein a single module element, i.e., the inflator diffuser 16, extends therethrough, the broader practice of the invention is not necessarily so limited. For example, the airbag cushion may include two or more such attachment openings with corresponding or associated module elements passing therethrough in cushion attachment securing relationship. It will be appreciated, however, that the inclusion of two or more such attachment openings may undesirably complicate one or more of the production, manufacture and assembly of the component parts or the assembly combination and thus is not generally preferred. In particular, the inclusion of more than four such attachment openings with corresponding or associated module elements passing therethrough in cushion attachment securing relationship is generally to be avoided.

It is also to be appreciated that in those embodiments which include two or more such attachment openings with corresponding or associated module elements passing therethrough in cushion attachment securing relationship, such multiple attachment openings need not necessarily be symmetrically arranged or positioned, particulary where the attachment of the airbag cushion otherwise permits the uniform distribution of loads and stresses.

In addition, it will be appreciated that the broader practice of the invention is not necessarily limited or restricted to airbag module assembly combinations and airbag cushion forms of attachment wherein the module element extending through a cushion attachment opening is in the form of a diffuser. For example, the module element extending through a respective airbag cushion attachment opening may, if desired, take the form of a stud or shaft.

The invention has been described above relative to assembly combinations employing a very simple airbag cushion construction. While the utilization of such a simple airbag construction may have many practical and economical advantages, it is to be appreciated that the broader practice of the invention is not necessarily limited to use with such simplified airbag constructions. For example, FIGS. 4–15 illustrate alternative preferred airbag cushion constructions which may be employed as part of airbag module assembly combinations in accordance with the invention.

Figure 4:
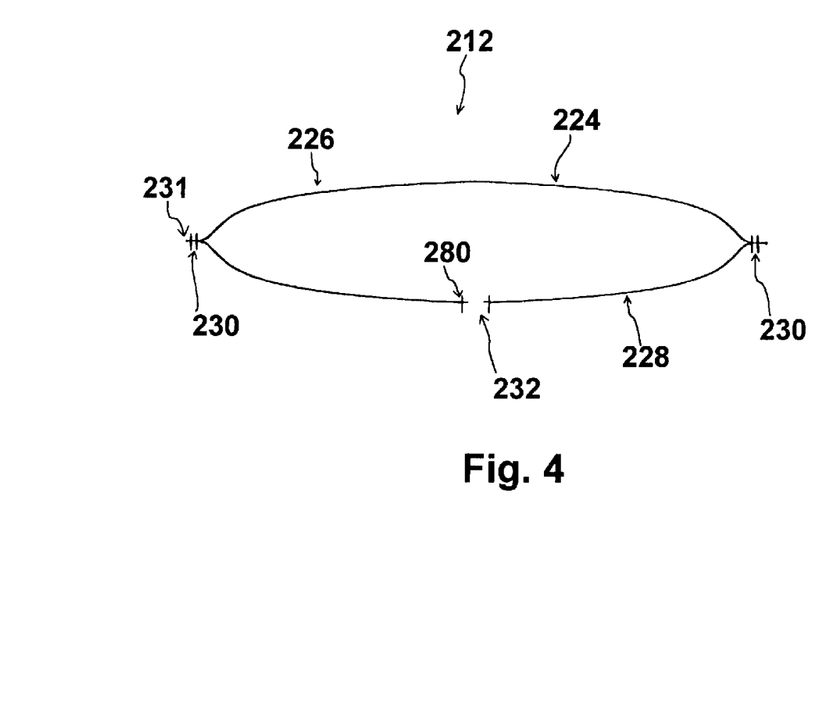
FIG. 4 is a simplified sectional side view, similar to FIG. 2, of an alternative airbag cushion design for use in the practice of the invention.
Figure 5:
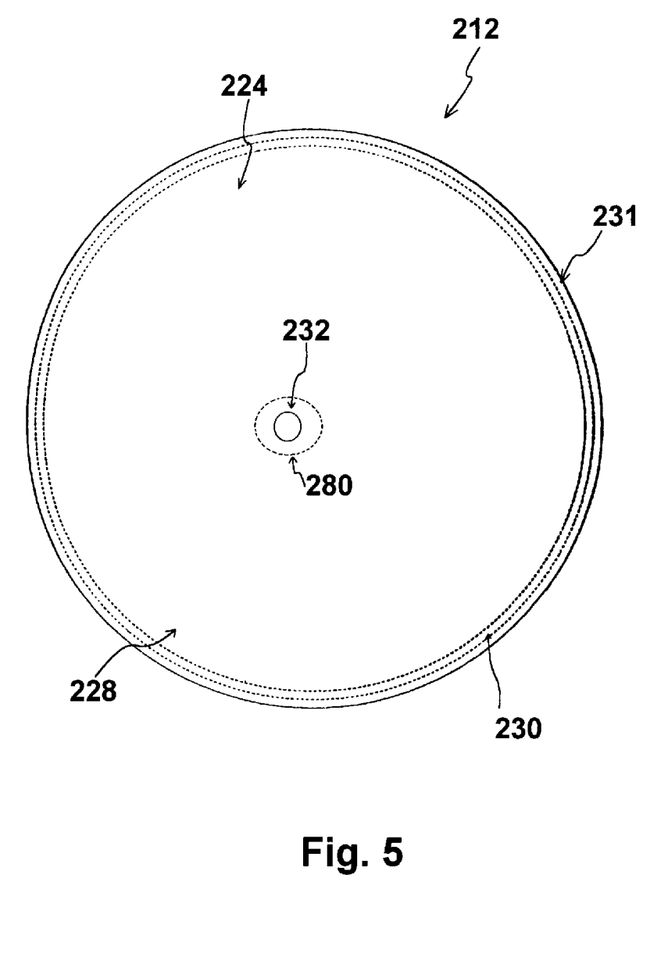
FIG. 5 is a simplified bottom plan view, similar to FIG. 3, of the airbag cushion shown in FIG. 4.

Turning first to FIGS. 4 and 5, there is illustrated an airbag cushion 212 which, similar to the airbag cushion 12, described above, includes a main body 224 generally composed of generally circular front and back panels, 226 and 228, respectively, with the respective peripheries thereof generally joined together by a double stitch sew line 230 to form a normally external outer diameter sew selvage 231. The back panel 228 of the airbag cushion 212 also similarly includes a generally centrally located or positioned cushion attachment opening or hole 232. The cushion opening 232 includes a sew line 280 of reinforcing stitches about the periphery thereof. The inclusion of such an airbag cushion opening sew line may be desirable to provide additional reinforcement to the opening and thus further assist the avoidance or resistance of tearing or failure by the airbag cushion or respective airbag module assembly combinations formed therewith.

As will be appreciated, such a sew line can be in the form of a single or multiple lines of stitches.

Figure 6:
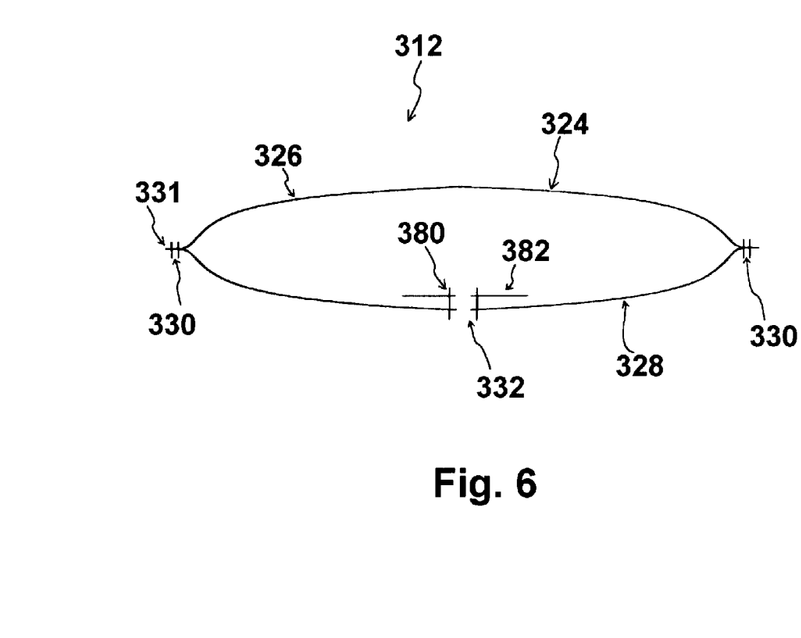
FIG. 6 is a simplified sectional side view, similar to FIG. 2, of another alternative airbag cushion design for use in the practice of the invention.
Figure 7:
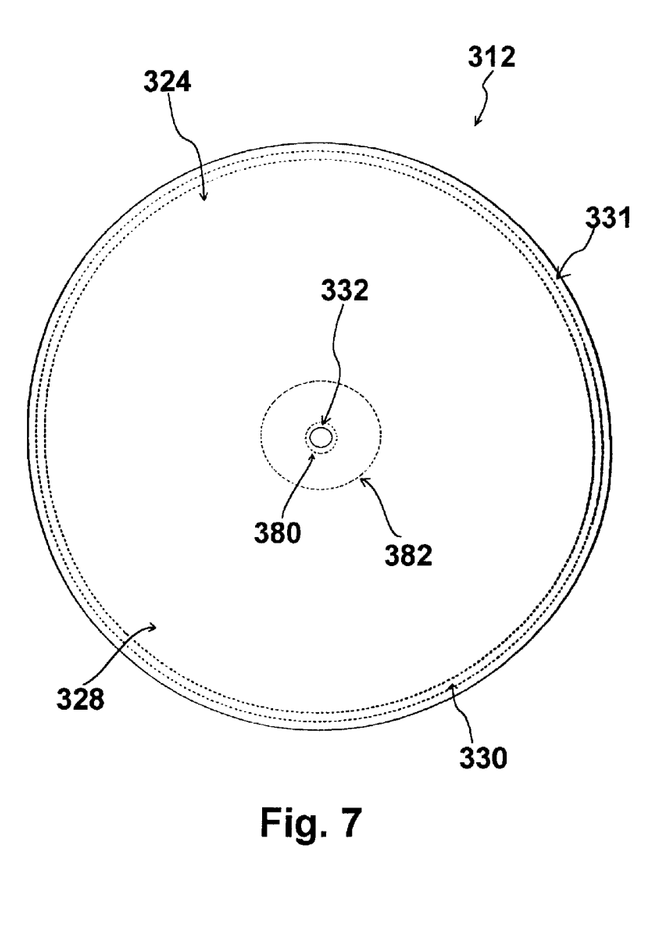
FIG. 7 is a simplified bottom plan view, similar to FIG. 3, of the airbag cushion shown in FIG. 6.

FIGS. 6 and 7 illustrate an airbag cushion, generally designated by the reference numeral 312, in accordance with another alternative embodiment of the invention. The airbag cushion 312 includes a main body 324 generally composed of generally circular front and back panels, 326 and 328, respectively, with the respective peripheries thereof generally joined together by a double stitch sew line 330 to form a normally external outer diameter sew selvage 331. The back panel 328 of the airbag cushion 312 also includes a generally centrally located or positioned cushion attachment opening or hole 332 having a sew line 380 about the periphery thereof, similar to the airbag cushion 212, described above.

The airbag cushion 312 differs from the above-described airbag cushion 212, however, in that the sew line 380 additionally serves to attach of a reinforcement layer of airbag material, designated by the reference numeral 382, at the airbag cushion opening 332, within the interior of the airbag cushion 312. Such a reinforcement layer may be included in those assembly combinations where additional reinforcement and stress resistance by the airbag cushion is desired.

It will be appreciated that such reinforcement layer of airbag material may be of the same or different construction or formulation as the material used in the construction of the inflatable body of the cushion. Further, it is to be appreciated that multiple reinforcement layers may, if desired, be employed in the construction of the airbag cushion for use in an assembly combination in accordance with the invention. In practice, however, a single reinforcement layer typically provides adequate desired reinforcement for most applications. Still further, it is to be appreciated that such single or multiple reinforcement layers can be alternatively internally (as shown) or externally joined to an associated cushion main body, as may be desired.

Figure 8:
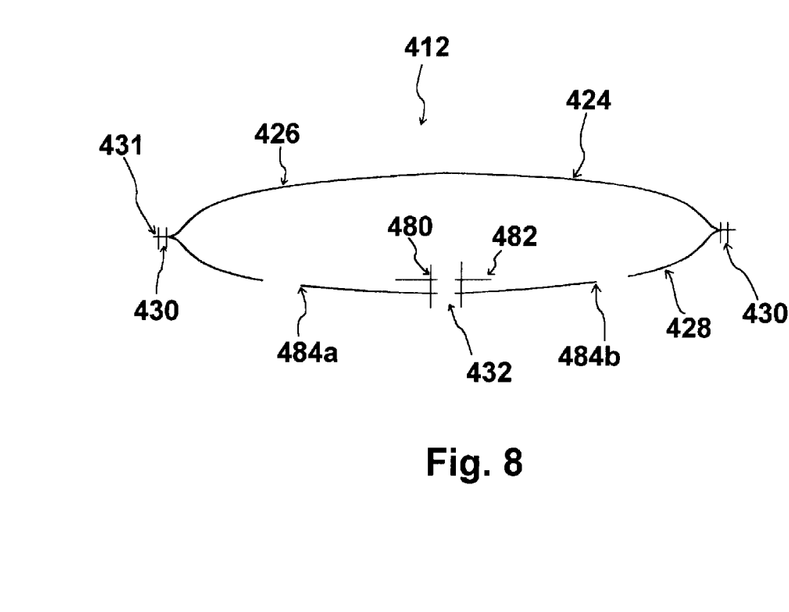
FIG. 8 is a simplified sectional side view, similar to FIG. 2, of yet another alternative airbag cushion design for use in the practice of the invention.
Figure 9:
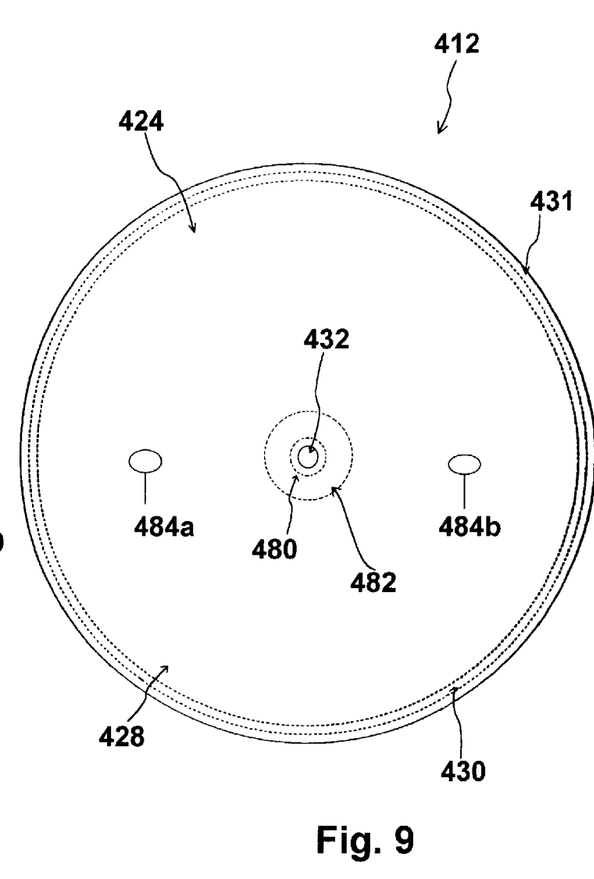
FIG. 9 is a simplified bottom plan view, similar to FIG. 3, of the airbag cushion shown in FIG. 8.

FIGS. 8 and 9 illustrate an airbag cushion, generally designated by the reference numeral 412, in accordance with yet another alternative embodiment of the invention. As with the above-described airbag cushion embodiments, the airbag cushion 412 includes a main body 424 generally composed of generally circular front and back panels, 426 and 428, respectively, with the respective peripheries thereof generally joined together by a double stitch sew line 430 to form a normally external outer diameter sew selvage 431. The back panel 428 of the airbag cushion 412 also includes a generally centrally located or positioned cushion attachment opening or hole 432 having a sew line 480 about the periphery thereof and which serves to attach a reinforcement layer of airbag material 482 similar to the airbag cushion 312, described above.

The airbag cushion 412 differs from the above-described airbag cushion 312, however, in the inclusion of discrete vent holes 484*a* and 484*b*, respectively, suitably placed in the airbag cushion material. For example, in the airbag cushion 412, the discrete vent holes 484*a* and 484*b* are each positioned about the back panel 428 such as may be desired to result in inflation gas exhaust or venting from the airbag cushion 412 in a general direction normally away or opposite from an occupant seated opposite the cushion front panel 426. As will be appreciated by one skilled in the art, the number, size and placement of such vent holes in a particular airbag cushion design can be appropriately selected in order to provide specifically desired corresponding inflation and deployment performance.

For example, the inclusion of such vent holes may be desired in particular inflatable restraint installations such as to produce or result in a more rapid or immediate exhausting of inflation gas from the corresponding airbag cushion. More specifically, the inclusion of one or more of such discrete vent holes may be desired in installations employing an airbag cushion wherein both the front and back panels, 426 and 428, respectively, are each coated or otherwise rendered substantially impermeable to the passage of inflation fluid therethrough. It will be appreciated, however, that the incorporation of discrete vent holes in airbag cushions in accordance with the invention is not limited to those airbag cushion main bodies which are otherwise substantially impermeable to the passage of inflation fluid therethrough. For example, uncoated or otherwise permeable airbag cushions may, if desired and dependent on the particular application, include one or more such vent holes.

As will be appreciated, an airbag cushion can, if desired, include such a vent hole or holes without necessarily including one or more reinforcement layer of material 482.

Figure 10:
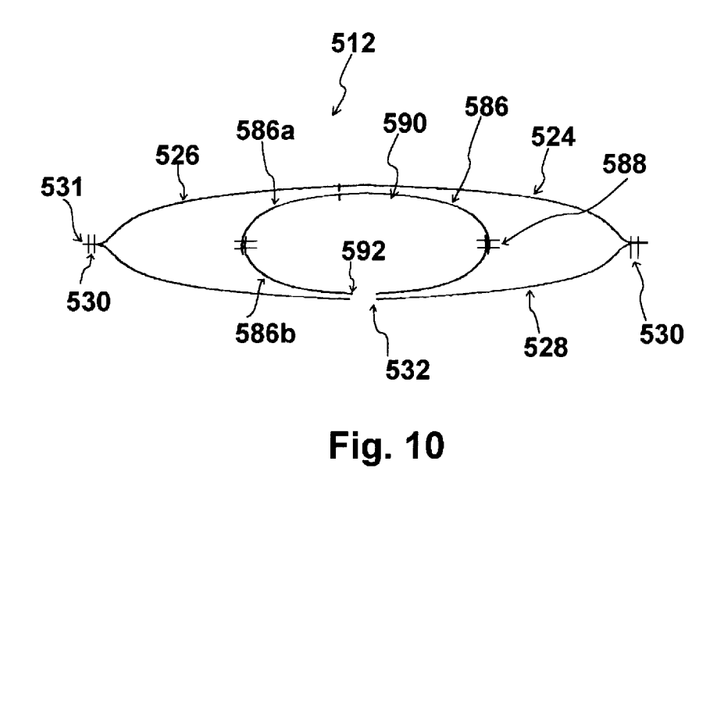
FIG. 10 is a simplified sectional side view, similar to FIG. 2, of yet still another alternative airbag cushion design for use in the practice of the invention.
Figure 11:
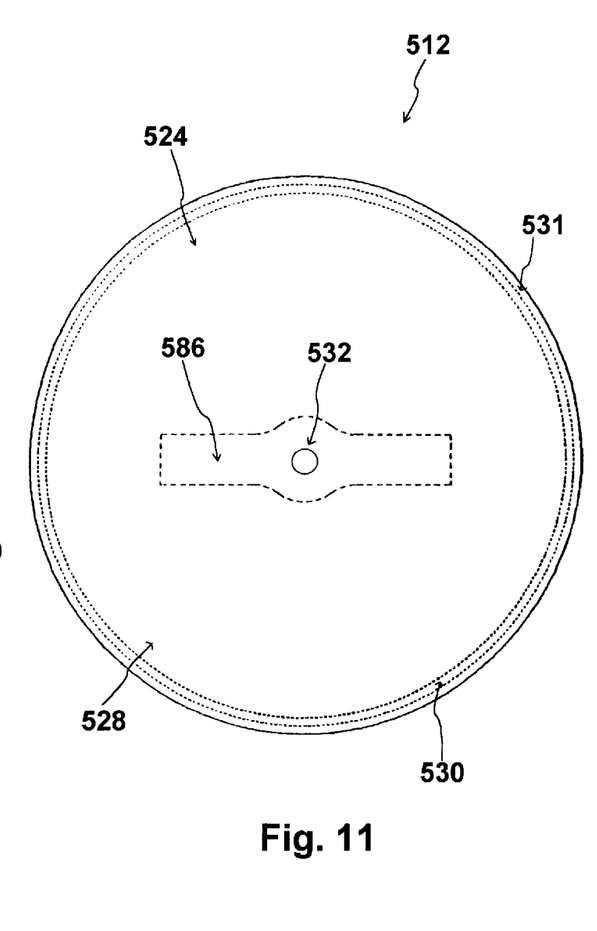
FIG. 11 is a simplified bottom plan view, similar to FIG. 3, of the airbag cushion shown in FIG. 10.

FIGS. 10 and 11 illustrate an airbag cushion, generally designated by the reference numeral 512, in accordance with yet still another alternative embodiment of the invention. The airbag cushion 512, similar to the airbag cushion 12 described above, includes a main body 524 generally composed of generally circular front and back panels, 526 and 528, respectively, with the respective peripheries thereof generally joined together by a double stitch sew line 530 to form a normally external outer diameter sew selvage 531. The back panel 528 of the airbag cushion 512 also includes a generally centrally located or positioned cushion attachment opening or hole 532.

The airbag cushion 512 differs from the above-described airbag cushions 12 and 112, however, in the inclusion of an internal tether 586. The tether 586 is composed of a base tether portion 586*a* and a tether airbag cushion opening portion 586*b* such as joined together by a double stitch sew line 588. The base tether portion 586*a* is desirably attached or otherwise joined within the airbag cushion 512 such as by being sewn to the inside of cushion front panel 526, such as shown by the sew line 590. The tether airbag cushion opening portion includes an opening or hole 592 generally corresponding to the airbag cushion opening 532 formed in the cushion back panel 528.

In assemblies with the airbag cushion 512, the tether opening 592 and the airbag cushion opening 532 can desirably be aligned to facilitate assembly such as by permitting the simultaneous extension of the module element through the cushion opening 532 and the tether opening 592. An airbag module assembly in accordance with the invention and including the airbag cushion 512 permits the airbag cushion opening 532 and the tether opening 592 to generally similarly move relative to the corresponding module element.

Figure 12:
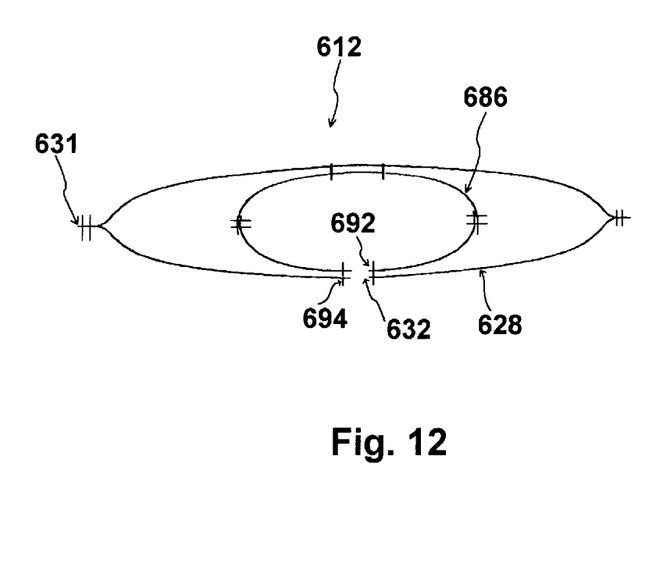
FIG. 12 is a simplified sectional side view, similar to FIG. 2, of yet still even another alternative airbag cushion design for use in the practice of the invention.
Figure 13:
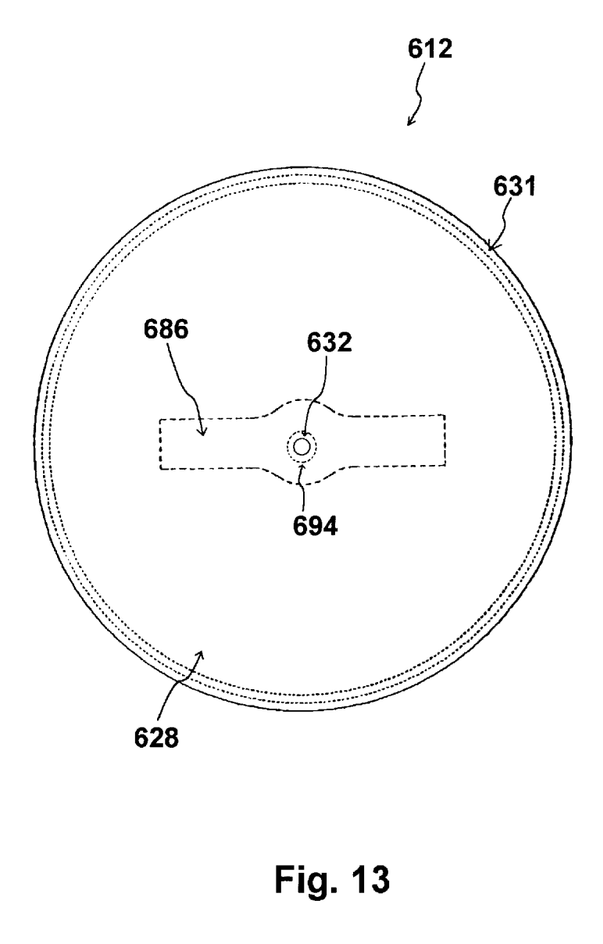
FIG. 13 is a simplified bottom plan view, similar to FIG. 3, of the airbag cushion shown in FIG. 12.

FIGS. 12 and 13 illustrate an airbag cushion, generally designated by the reference numeral 612, for use in another embodiment of the invention. The airbag cushion 612 is generally similar to the airbag cushion 512 described above with the added feature that the internal tether 686 is joined or attached to the back panel 628, such as by means of a sew line 694 joining the periphery of the cushion attachment opening 632 with the periphery of the tether opening 692, such as may be desired to facilitate alignment of the tether opening 692 with the cushion opening 632 during the assembly process.

It will be appreciated that the various features of the above-described airbag cushions such as including: altering the permeability of a selected portion or more of a particular airbag cushion such as by the inclusion of a coating or altering the structure of the cushion material; inclusion of a sew line around the periphery of the cushion opening; inclusion of one or more reinforcement layers; inclusion of one or more discrete vent holes; and inclusion of an internal cushion tether such sewn to the inside of the front panel and either attached or not to the back panel, can be combined in various combinations as may be deemed desirable for particular vehicular restraint system applications.

Figure 14:
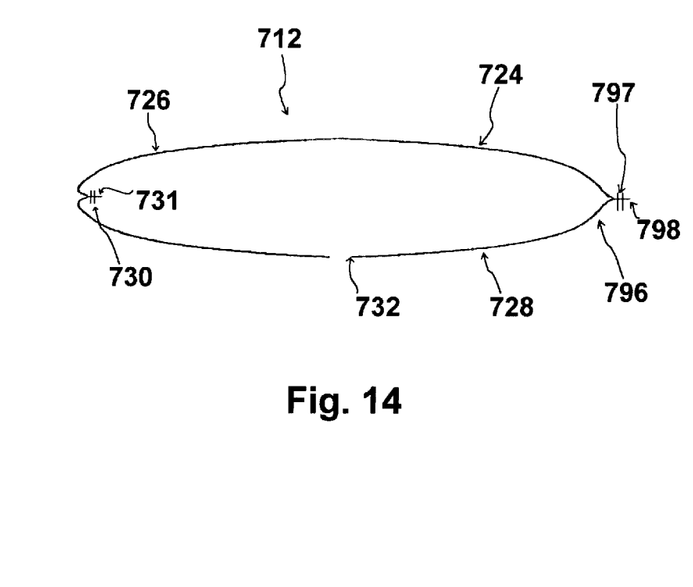
FIG. 14 is a simplified sectional side view, similar to FIG. 2, of an additional alternative airbag cushion design for use in the practice of the invention.
Figure 15:
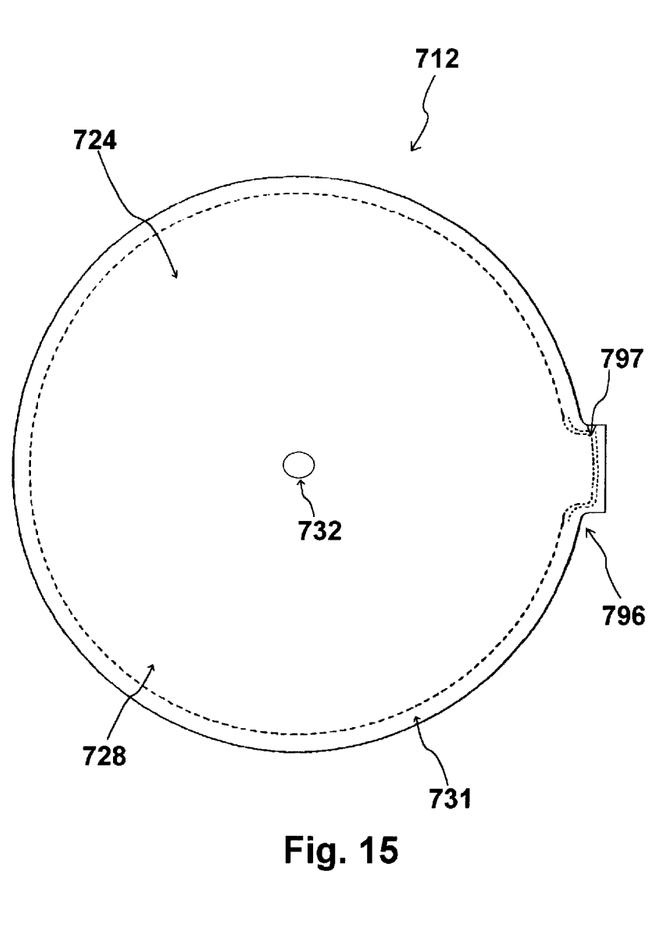
FIG. 15 is a simplified bottom plan view, similar to FIG. 3, of the airbag cushion shown in FIG. 14.

FIGS. 14 and 15 illustrate an airbag cushion, generally designated by the reference numeral 712, for use in another embodiment of the invention. The airbag cushion 712 is generally similar to the airbag cushion 12 described above except that the outer diameter sew selvage is generally contained within the cushion. Such an airbag cushion is generally fabricated in a traditional manner with the cushion forming a main body 724 which may, in the broader practice of the invention, take any form such as well known in the prior art. For example, two circular pieces of suitable airbag cushion material, such as of suitable fabric, can be laid one on top of the other and a seam formed about their periphery. The particular airbag cushion 712 is generally composed of generally circular front and back panels, 726 and 728, respectively. The airbag cushion back panel 728 includes a generally centrally located or positioned cushion attachment opening or hole 732, such as in the manner and function described above.

The airbag cushion 712 may be fabricated by initially joining together the respective peripheries of the front and back panels, 726 and 728, respectively, with the exception of a small inversion section 796 of the partially stitched together airbag cushion. For example, the respective peripheries of the front and back panels can be joined together by means of a double stitch sew line 730 and such as to form an outer diameter sew selvage 731.

As identified above, the respective peripheries of the front and back panels are not initially stitched together at the inversion section 796 which is desirably large enough to permit the partially stitched together airbag cushion to be turned inside out and the placement within the airbag cushion of an airbag retainer plate, such as described above in the case of an airbag module assembly combination such as shown in FIG. 1.

Upon being turned inside out, the outer diameter sew selvage 731 will then be internal to the airbag cushion 712. The peripheries of the front and back panels, at the inversion section 796, can be stitched together such as also by means of a double stitch sew line 797, with the outer diameter sew selvage 798 at the inversion section 796 being external the finally fabricated airbag cushion 712.

As will be appreciated, the turning inside out of the partially stitched together cushion in the above-described fabrication process may render undesirably complicated or difficult the inclusion in such an airbag cushion of the common types of internal cushion tethers. However, various of the other above-described airbag cushion features such as including: altering the permeability of a selected portion or more of a particular airbag cushion such as by the inclusion of a coating or altering the structure of the cushion material; inclusion of a sew line around the periphery of the cushion opening; inclusion of one or more reinforcement layers; and inclusion of one or more discrete vent holes can be combined in various combinations with such an airbag cushion design wherein the outer diameter sew selvage is largely contained within the cushion.

In addition, if desired, airbag module assemblies in accordance with the invention may additionally comprise or include a clocking or other orientation feature such as to facilitate or otherwise provide confirmation of proper desired orientation of a particular airbag cushion relative to corresponding assembly hardware. For example, the assembly hardware may additionally include a locator pin or the like such as may be designed for passage through a corresponding locator device opening in the airbag cushion to ensure proper and consistent orientation of the airbag cushion relative to the assembly hardware. As will be appreciated and as is commonly known in the art, the assembly inclusion of such an orientation feature may be particularly desirable in those assembly combinations wherein the respective airbag cushion includes one or more features, such as discrete vent holes or openings and tethers, for which either or both proper and consistent orientation may be desired.

In view of the above, it will be appreciated that the invention provides improved arrangements and methods for attaching airbag cushions such as used in an inflatable restraint system such as used to provide protection to vehicle occupants. In particular, at least certain of the subject forms of airbag cushion attachment have been found to advantageously avoid or minimize at least some of the difficulties associated with certain prior art airbag cushion attachment arrangements and methods.

For example, the invention provides improved arrangements and methods for attaching airbag cushions which avoid or minimize deployment stress concentrations such as can undesirably be associated with airbag cushion attachments that include multiple finite clamping points (e.g., five or more) such as in the form of rivets, bolts or other, similar, fastening means and such as may be associated with failure, tearing or other undesired effect upon the airbag cushion material.

Further, the invention provides improved arrangements and methods for attaching airbag cushions such as to minimize or avoid the inclusion of multiple layers of reinforcement material. As will be appreciated, the inclusion of such reinforcements can undesirably increase assembly weight or cost.

Thus, it is to be appreciated that the invention can provide airbag cushion arrangements and methods for attaching such airbag cushions which can significantly reduce material, processing and assembly costs while performing to the high standards normally associated with such inflatable restraint systems.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention and are thus within the scope of the subject invention.

What is claimed is:

1. A method of joining an inflatable airbag cushion in an airbag module which includes: an inflatable airbag cushion comprising at least a front and a back panel with the airbag cushion having an inflatable body defining an attachment opening, an inflator disposed externally relative to the inflatable body and a module element extending from the inflator through the cushion attachment opening, the module element having opposed first and second ends with the first end disposed adjacent the inflator and directly joined thereto, said method comprising the steps of:

fixing an airbag retainer relative to the module element to clamp the cushion opening between the inflator and the airbag retainer, wherein the module element provides a conduit for passage of inflation fluid with the module element second end extending into the cushion inflatable body and wherein, prior to said fixing step, the airbag retainer is floatingly confined within the inflatable body and joining the front and back panels together about their respective peripheries, wherein prior to completely joining together the front and back panels, the airbag retainer is placed within the airbag cushion.

2. The method of claim 1 wherein the airbag retainer is substantially planar with the cushion inflatable body in the vicinity of the cushion opening and wherein the module element is an inflator diffuser extending from an inflator disposed outside of the inflatable body, the diffuser having a distal, gas diffusing end comprising the second end projecting within the inflatable body, additionally comprising the step of:

securing the airbag retainer with the diffusing end.

3. The method of claim 1 wherein the inflator includes at least one longitudinally-extending projection forming the module element extending through the cushion opening.

4. The method of claim 1 wherein the cushion includes a sew line of reinforcing stitches around the cushion opening and securing at least one reinforcement layer of material to the cushion, additionally comprising the step of:

extending the module element through both the cushion opening and the at least one reinforcement layer of material.

5. The method of claim 1 wherein the cushion includes an internal tether, the tether having an opening generally corresponding to the cushion opening, additionally comprising the step of:

extending the module element through both the cushion opening and the tether opening.

* * * * *